(12) United States Patent
Nakakuki et al.

(10) Patent No.: US 9,711,820 B2
(45) Date of Patent: Jul. 18, 2017

(54) STACKED CELL MANUFACTURING METHOD AND APPARATUS USING THE SAME

(71) Applicant: Hitachi Power Solutions Co., Ltd., Hitachi-shi, Ibaraki (JP)

(72) Inventors: Shoji Nakakuki, Hitachi (JP); Shuji Yonai, Hitachi (JP); Mitsunori Sekiya, Hitachi (JP)

(73) Assignee: Hitachi Power Solutions Co., Ltd., Hitachi-shi (JP)

( * ) Notice: Subject to any disclaimer, the term of this patent is extended or adjusted under 35 U.S.C. 154(b) by 571 days.

(21) Appl. No.: 14/180,399

(22) Filed: Feb. 14, 2014

(65) Prior Publication Data

US 2014/0237808 A1 Aug. 28, 2014

(30) Foreign Application Priority Data

Feb. 26, 2013 (JP) .................................. 2013-035797

(51) Int. Cl.
| | | |
|---|---|---|
| *H01M 10/04* | (2006.01) | |
| *H01M 10/0583* | (2010.01) | |
| *H01M 10/0525* | (2010.01) | |

(52) U.S. Cl.
CPC ... *H01M 10/0459* (2013.01); *H01M 10/0404* (2013.01); *H01M 10/0463* (2013.01);
(Continued)

(58) Field of Classification Search
CPC ......... H01M 10/0404; H01M 10/0459; H01M 10/0463
(Continued)

(56) References Cited

U.S. PATENT DOCUMENTS

| | | | |
|---|---|---|---|
| 2006/0051652 A1* | 3/2006 | Samuels | B65H 29/241 29/623.1 |
| 2010/0132308 A1* | 6/2010 | Kadowaki | H01M 10/0459 53/212 |
| 2015/0263375 A1 | 9/2015 | Redmann | |

FOREIGN PATENT DOCUMENTS

| | | |
|---|---|---|
| JP | 2002-270242 A | 9/2002 |
| JP | 2004-22449 A | 1/2004 |

(Continued)

OTHER PUBLICATIONS

European Search Report issued in counterpart European Application No. 14155148.1 dated Aug. 3, 2016 (nine pages).

*Primary Examiner* — Sean P Cullen
(74) *Attorney, Agent, or Firm* — Crowell & Moring LLP (57) ABSTRACT

The stacked cell manufacturing method includes the steps of executing zigzag-folding of a band-like separator by the intermediary of a zigzag-folding mechanism, alternately feeding a positive-plate and a negative-plate onto the separator as folded back every time the separator is folded back by the zigzag-folding. A positive-plate transfer head and a negative-plate transfer head are set so as to alternately undergo a linearly reciprocating transfer in a horizontal direction at least on the table, the direction of a horizontal and reciprocating transfer made by the positive-plate transfer head and the negative-plate transfer head is set to coincide with a folding-back direction of the zigzag-folding of the separator, and a force caused by the horizontal and reciprocating transfer alternately made by each of these transfer heads is imparted to the separator guided onto the table, thereby executing the zigzag-folding while the separator is drawn onto the table.

8 Claims, 7 Drawing Sheets

(52) U.S. Cl.
CPC .... *H01M 10/0525* (2013.01); *H01M 10/0583* (2013.01); *Y10T 29/49108* (2015.01); *Y10T 29/53135* (2015.01)

(58) Field of Classification Search
USPC .................................................. 29/623.1, 730
See application file for complete search history.

(56) References Cited

FOREIGN PATENT DOCUMENTS

| | | |
|---|---|---|
| JP | 2010-102871 A | 5/2010 |
| JP | 2011-86507 A | 4/2011 |
| WO | WO 2010/126252 A2 | 11/2010 |
| WO | WO 2014/053112 A1 | 4/2014 |

\* cited by examiner

STACKED CELL MANUFACTURING METHOD AND APPARATUS USING THE SAME

CLAIM OF PRIORITY

The present application claims priority from Japanese Patent application serial No. 2013-35797, filed on Feb. 26, 2013, the content of which is hereby incorporated by reference into this application.

BACKGROUND OF THE INVENTION

1. Field of the Invention

The present invention relates to a stacked cell manufacturing method and an apparatus using the same, and in particular, to a manufacturing method suitable for application to, for example, a lithium ion cell, and so forth, and a manufacturing apparatus using the same.

2. Description of the Related Art

A stacked cell made up by alternately stacking a positive-plate and a negative-plate by the intermediary of a separator has advantages of high cooling property at the time of charging the cell, and less damage to the separator. As one of the stacked cells, a zigzag-folding type stacked cell made up by subjecting a separator to zigzag-folding, thereby alternately placing respective electrode-plates (a positive-plate, a negative plate) between folded surfaces of the separator is insusceptible to a wrinkle, and curling up because the separator is continuously in use, and further, the zigzag-folding type stacked cell can be produced irrespective of a type of the separator. A zigzag-folding type stacked cell according to the related art is disclosed in, for example, Japanese Unexamined Patent Application Publication No. 2004-22449.

With the manufacturing apparatus of zigzag-folding type stacked cell according to the related art, a separator zigzag-folding machine, a positive-plate feeding-unit, and a negative-plate feeding-unit are each separately prepared, and the positive-plate feeding-unit and the negative-plate feeding-unit are disposed on the respective sides of a work position where the zigzag-folding of the separator is executed. The positive-plate feeding-unit and the negative-plate feeding-unit are disposed in a direction orthogonal to the zigzag-folding direction of the separator with the work-position for the zigzag-folding, interposed therebetween.

Accordingly, in the case where the respective electrode-plates (the positive-plate, and the negative plate) are alternately fed from the positive-plate feeding-unit and the negative-plate feeding-unit, respectively, to the work position for the zigzag-folding of the separator, a motion for the zigzag-folding of the separator is interrupted every time the electrode-plate is fed, so that a continuous stacking work has become difficult to be executed, thereby creating a factor for deterioration in production efficiency. Further, a problem has existed in that stacking accuracy cannot be improved due to a transfer occurring to a stacking part of the separator/the electrode-plate.

A cell assembly system is required to satisfy conditions including (a) prevention of foreign matter interfusion, (b) enhancement in accuracy in order to ensure high-performance, and (c) achievement of highly efficient production.

The present invention has been developed from the standpoint described as above, and it is therefore a primary object of the invention to provide a zigzag-folding type stacked cell manufacturing method and an apparatus using the same which achieves a highly efficient production.

SUMMARY OF THE INVENTION (1) The invention basically provides a stacked cell manufacturing method includes the steps of executing zigzag-folding of a band-like separator on a table by the intermediary of a zigzag-folding mechanism, alternately feeding a positive-plate and a negative-plate onto the separator as folded back by the intermediary of a positive-plate feeding-mechanism, and a negative-plate feeding-mechanism, respectively, every time the separator is folded back by the zigzag-folding, and alternately stacking the positive-plate and the negative-plate on the table with the separator interposed therebetween. In the step of stacking, a positive-plate transfer head as a part of the positive-plate feeding-mechanism, and a negative-plate transfer head as a part of the negative-plate feeding-mechanism are set so as to alternately undergo a linearly reciprocating transfer in a horizontal direction at least on the table by the intermediary of respective transfer mechanisms, the direction of a horizontal and reciprocating transfer on the table, made by the positive-plate transfer head and the negative-plate transfer head is set to coincide with a folding-back direction of the zigzag-folding of the separator, and a force caused by the horizontal and reciprocating transfer alternately made by each of these transfer heads is imparted to the separator guided onto the table by the intermediary of the positive-plate transfer head and the negative-plate transfer head, respectively, thereby executing the zigzag-folding while the separator is drawn onto the table, and the positive-plate transfer head and the negative-plate transfer head alternately feed the positive-plate and the negative-plate onto the table while executing the zigzag-folding of the separator.

On the basis of the invention described as above, the following configurations may be added thereto:

(2) a plurality of the tables are provided to be disposed at equal intervals, spaced by a predetermined angle, along the peripheral direction of a horizontal axis rotator capable of rotation, the horizontal axis rotator is provided directly underneath a travelling path of the horizontal and reciprocating transfer made by the positive-plate transfer head and the negative-plate transfer head, such that a tangent direction of an upper part of the periphery of the horizontal axis rotator is in parallel with the direction of the horizontal and reciprocating transfer made by the positive-plate transfer head and the negative-plate transfer head, the respective tables disposed at the equal intervals are set to be sequentially transferred through rotation of the horizontal axis rotator by a predetermined angle to a position for the step of the stacking in cell-manufacturing to be subsequently transferred to a station at a position for a post-stacking step taken after the step of the stacking, the respective tables being set to return to the station for the step of the stacking upon one-shot rotation of the horizontal axis rotator, the step of the stacking, and the post-stacking step are taken in parallel with each other during an interval between the rotations of the horizontal axis rotator, when the rotation thereof is suspended;

(3) the table is transferred to the station at the position for the subsequent post-stacking step through the rotation of the horizontal axis rotator by the predetermined angle after the step of the stacking is taken, the stacked body, together with a tail of the separator, trailing behind the stacked body, is caused to undergo vacuum-contact on the periphery of the horizontal axis rotator, while a stacked body of the electrode-plates and the separator, formed in the step of the stacking, is being held on the table by a clamp-mechanism at the time of the transfer, the tail of the separator, present on the periphery of the horizontal axis rotator, is cut off by a cutter at a position between the station for the post-stacking step and the station for the stacking step, the stacked body is disengaged from the table in the station for the post-stacking step by the intermediary of a rotary-chuck mechanism to be rotated, the tail of the separator, remaining on the side of the stacked body as a result of the cutting of the separator, is wrapped around the outer periphery of the stacked body by the rotation, and another table is present in the station for the stacking-step at the time of the post-stacking step, thereby enabling a new stacking step to be concurrently taken;

(4) if an electrode-plate overlaid on the separator subjected to the zigzag-folding is a positive-plate in the stacking-step, the positive-plate is held down by a holding-down member for exclusive use by a positive-plate, at a position on a side of the valley-folding of the zigzag-folding of the separator, and if the electrode-plate is a negative-plate, the negative-plate is held down by a holding-down member for exclusive use by a negative-plate, at a position on the side of the valley-folding of the zigzag-folding of the separator, these holding-down members each serve as a guide for the valley-folding at the time of the zigzag-folding of the separator, and the holding-down member for exclusive use by the positive-plate, and the holding-down member for exclusive use by the negative-plate are alternately moved out from, or into respective stacking positions of the positive-plate and the negative-plate.

With the invention satisfying configuration requirements described under item (1) as above, the zigzag-folding of the separator and the feeding of the electrode-plates (alternate feeding of the positive-plate and the negative-plate) can be concurrently executed, and in addition, a continuous motion of the zigzag-folding of the separator can be realized, so that production efficiency can be enhanced. Furthermore, since the electrode-plates feeding-mechanisms, and the separator zigzag-folding mechanism can be realized by one common mechanism, the number of components of the system can be reduced.

With the invention satisfying configuration requirements described under item (2) as above, the separator electrode-plate stacking step of the stacked cell, and the post-stacking step to be taken thereafter can be carried out by use of one rotator, so that facilities can be simplified, and furthermore, a stacking-completion product can be replaced in a short time.

With the invention satisfying configuration requirements described under item (3) as above, in the case of wrapping around the periphery of the stacked body with the tail of a separator member, the separator tail is held with the use of a suitable vacuum-contact force necessary for taking up the separator, acting on the periphery of the rotator, so that it is possible to prevent occurrence of a wrinkle and curling up.

With the invention satisfying configuration requirements described under item (4) as above, in the step of executing zigzag-folding of a separator, an electrode-plate holding-down member used in the zigzag folding is set to hold down electrode-plates identical in polarity to each other at all times to thereby prevent metal powders and so forth, differing in polarity, from being mixed into the electrodes, so that short circuiting of electrodes, and so forth can be prevented, enabling further improvement in quality to be aimed at.

DETAILED DESCRIPTION OF THE PREFERRED EMBODIMENTS

Embodiments of the invention are described hereinafter with reference to an embodiment of the invention, shown in each of the accompanied drawings.

FIG. 1(a) through 1(l) are views showing one example of a process step of a stacked cell manufacturing method according to the invention.

The stacked cell manufacturing method executed, as shown in FIGS. 1(a) through 1(l), basically relates to a stacking step whereby a separator 6 made up of an insulating plastic sheet, band-like in shape, is subjected to zigzag-folding on a table 5 by the intermediary of a zigzag-folding mechanism, a positive-plate 3 and a negative-plate 4 are alternately fed onto the separator 6 as folded back by the intermediary of a positive-plate feeding-mechanism and a negative-plate feeding-mechanism every time the separator 6 is folded back by the zigzag-folding, and the positive-plate 3 and the negative-plate 4 with the separator 6 interposed therebetween are alternately stacked on the table, thereby forming a stacked body of separator•electrode-plate after a series of these process steps. The invention has a novel feature in that the zigzag-holding mechanism, in particular, is made up of a positive-plate transfer head 1 as apart of the positive-plate feeding-mechanism, and a negative-plate transfer head 2 as a part of the negative-plate feeding-mechanism.

In the stacking step, the separator 6 is fed from a separator feeder 36 (refer to FIG. 2), as described later on, to the upper surface of the table 5 via guide-rolls 34 (refer to FIG. 2), and a tension-imparting mechanism 35 (refer to FIG. 2). At the time of a separator•electrode-plate stacking work, an operator draws out the band-like separator 6 from above the table 5 to hold down a part of the band-like separator 6 on the upper surface of the table 5 by use of a zigzag-folding hold-down member (hereinafter referred to as "a zigzag-folding clamp") 8 for use in the zigzag-folding of a separator (FIG. 1(a)). This position for holding-down is in the vicinity of one end of the separator on the table 5, in a zigzag-folding direction thereof.

Figure 1A:
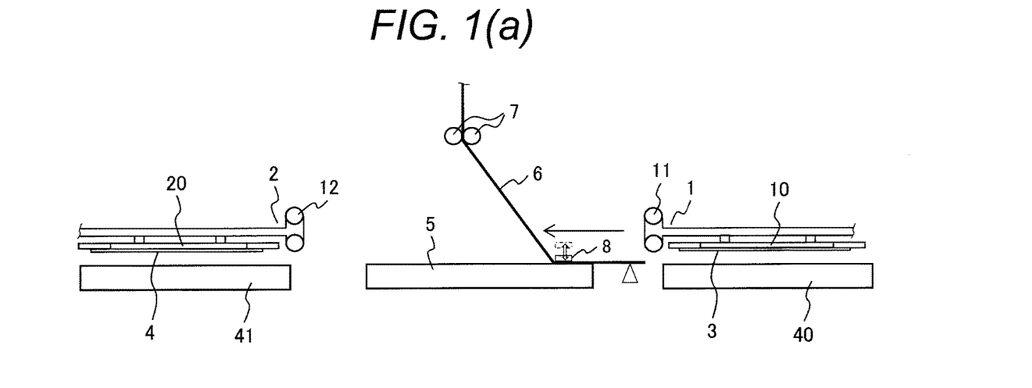
FIG. 1(a) is an illustration diagram showing a step of stacking a separator/electrode-plates of a stacked cell manufacturing method according to one embodiment of the invention.
Figure 1B:
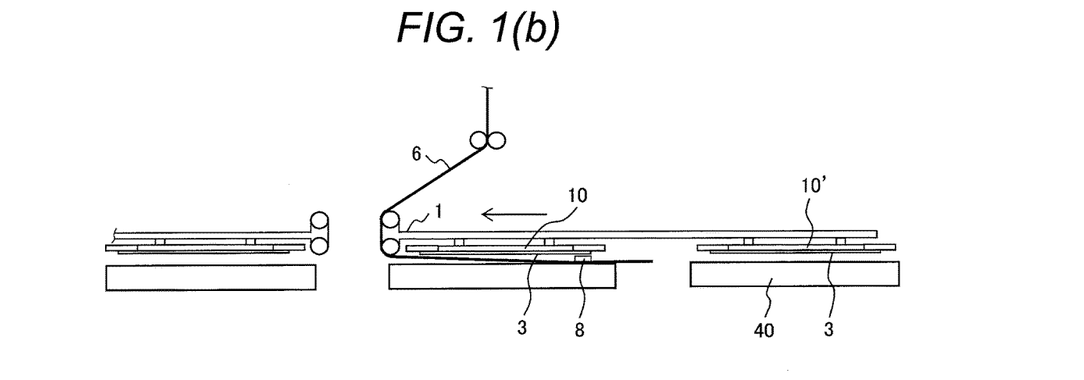
FIG. 1(b) is an illustration diagram showing a step of stacking the separator/the electrode-plates of the stacked cell manufacturing method according to the embodiment of the invention.
Figure 1C:
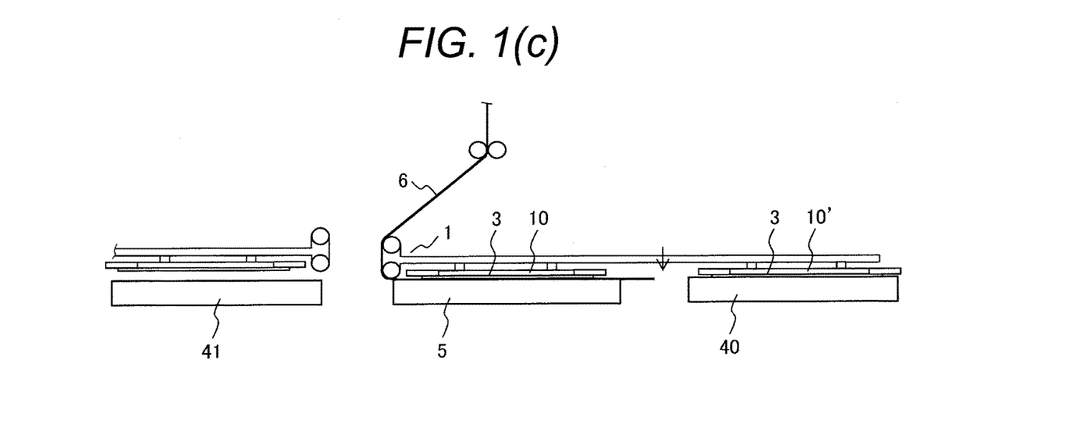
FIG. 1(c) is an illustration diagram showing a step of stacking the separator/the electrode-plates of the stacked cell manufacturing method according to the embodiment of the invention.
Figure 1D:
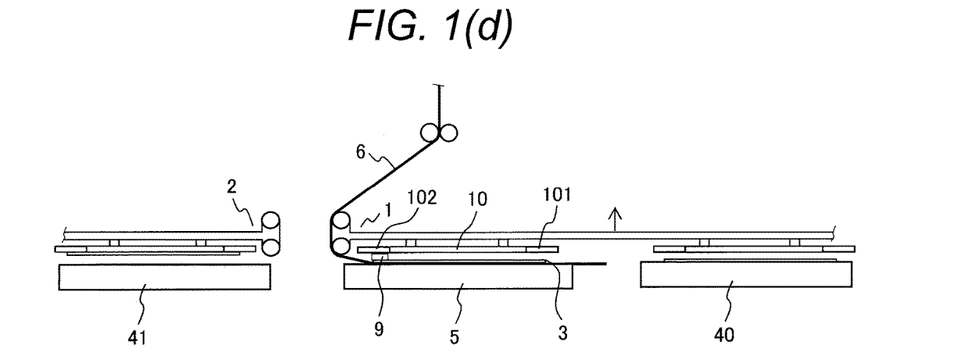
FIG. 1(d) is an illustration diagram showing a step of stacking the separator/the electrode-plates of the stacked cell manufacturing method according to the embodiment of the invention.
Figure 1E:
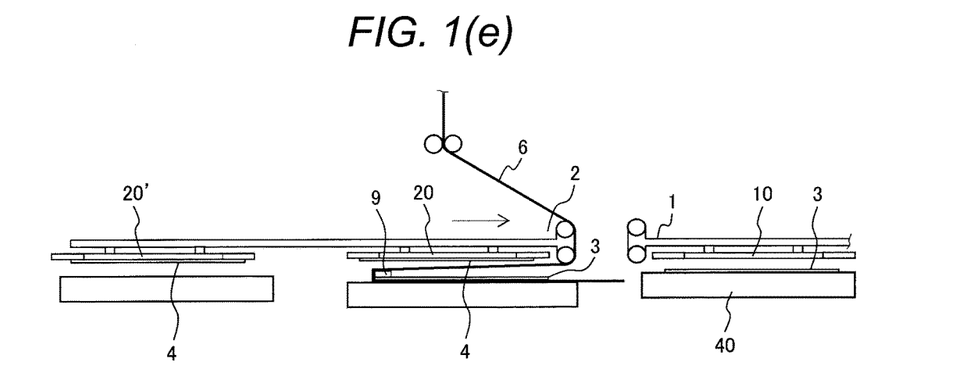
FIG. 1(e) is an illustration diagram showing a step of stacking the separator/the electrode-plates of the stacked cell manufacturing method according to the embodiment of the invention.
Figure 1F:
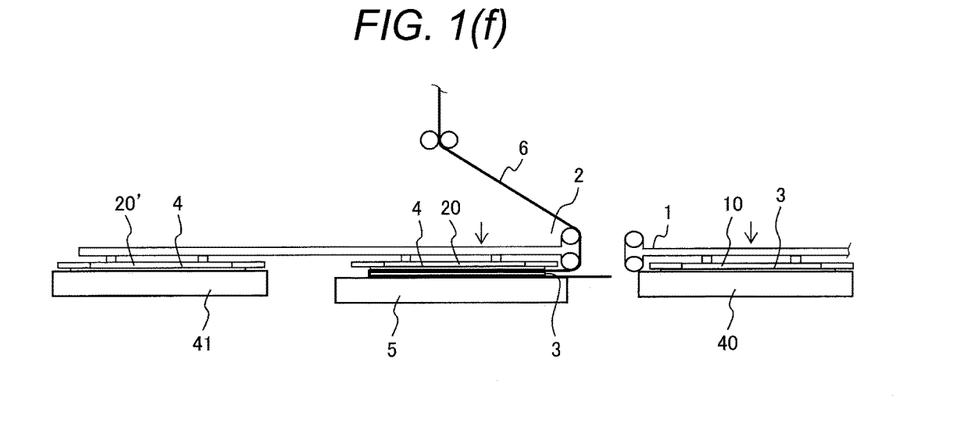
FIG. 1(f) is an illustration diagram showing a step of stacking the separator/the electrode-plates of the stacked cell manufacturing method according to the embodiment of the invention.
Figure 1G:
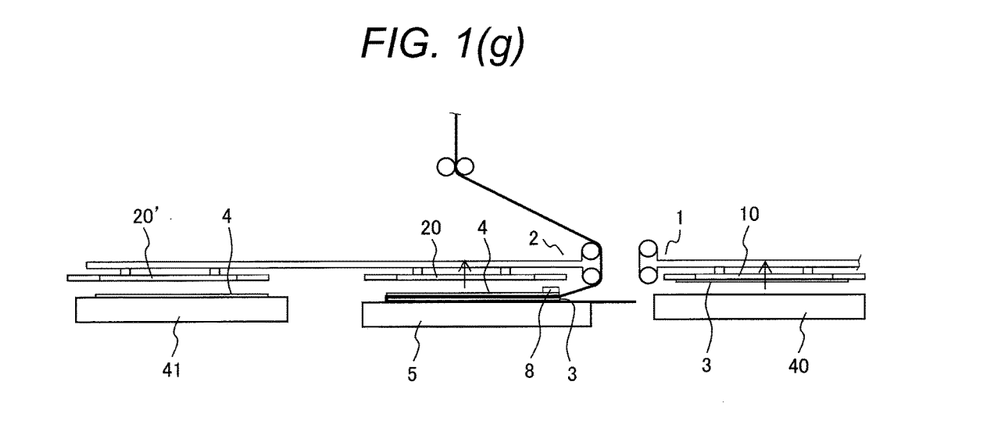
FIG. 1(g) is an illustration diagram showing a step of stacking the separator/the electrode-plates of the stacked cell manufacturing method according to the embodiment of the invention.
Figure 1H:
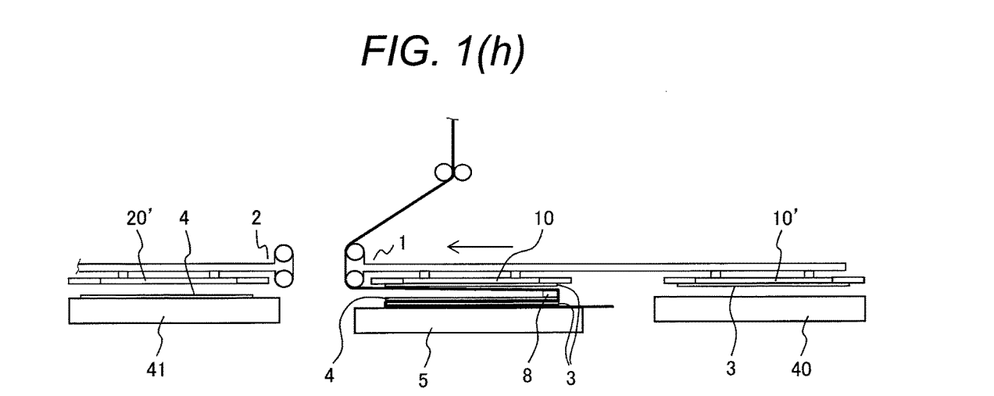
FIG. 1(h) is an illustration diagram showing a step of stacking the separator/the electrode-plates of the stacked cell manufacturing method according to the embodiment of the invention.
Figure 1I:
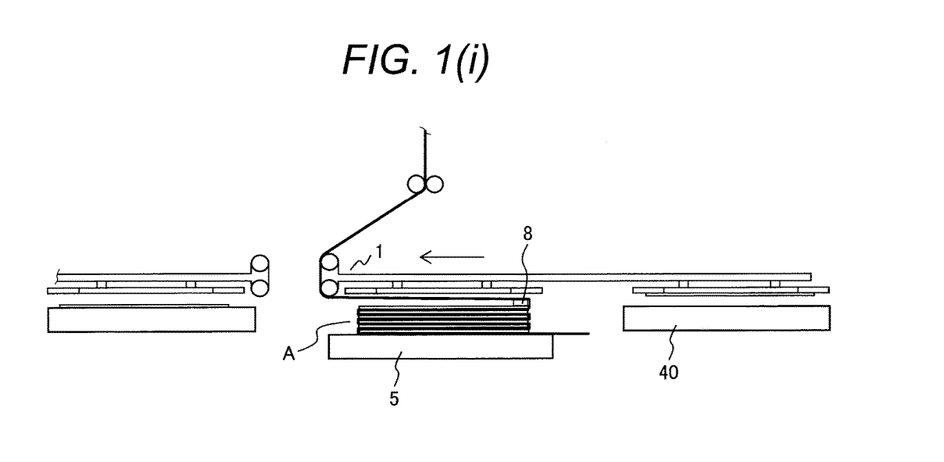
FIG. 1(i) is an illustration diagram showing a step of stacking the separator/the electrode-plates of the stacked cell manufacturing method according to the embodiment of the invention.

The zigzag-folding clamp (a first zigzag-folding clamp) 8 is used at first for holding down the separator 6 on the table 5, as described above, but the same is used thereafter for securing valley-folding (folding-back) on one side of the zigzag-folding of the separator 6 (refer to FIGS. 1(h) and 1(i)). Further, the zigzag-folding clamp 8 is positioned solely on the negative-plate 4 in a straightforward manner to thereby secure the valley-folding of the zigzag-folding.

In this connection, another zigzag-folding clamp (a second zigzag-folding clamp) 9 is used for securing the other valley-folding (folding-back) of the separator 6 (refer to FIG. 1(e)). Further, the zigzag-folding clamp 9 is positioned solely on the positive-plate 3 in a straightforward manner to thereby secure the valley-folding of the zigzag-folding.

A positive-plate chuck 10 as one of electrode-plate chucks for use in electrode-plate transfer is provided in the positive-plate transfer head 1, and a negative-plate chuck 20 as one of the electrode-plate chucks is provided in the negative-plate transfer head 2.

Figure 3:
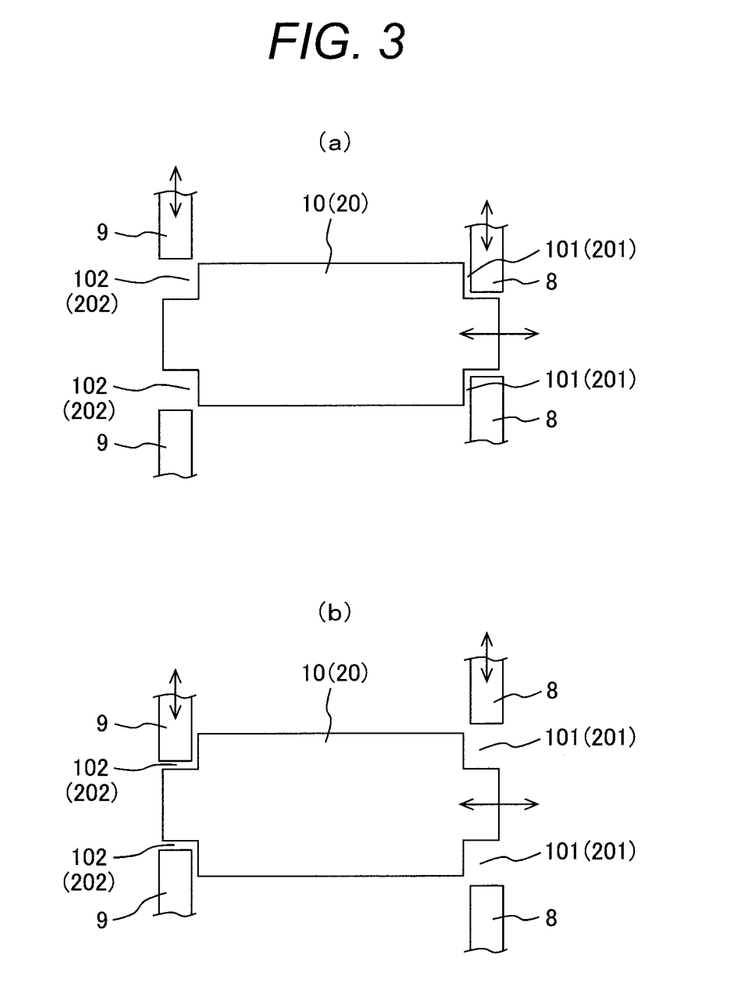
FIGS. 3(a) and 3(b) are views of zigzag-folding clamps 8, 9, and electrode-plate chucks (a positive-plate chuck 10 and a negative-plate chuck 20) as seen from above.

FIGS. 3(a) and 3(b) are views showing a positional relationship between the electrode-plate chuck (the positive-plate chuck 10 or the negative-plate chuck 20) and the zigzag-folding clamp 8 and the zigzag-folding clamp 9, respectively, and the shape of the electrode-plate chuck, as seen from above. The zigzag-folding clamp 8 and the zigzag-folding clamp 9 are each made up of a pair of clamps, and the respective pairs of the clamps are configured so as to move out from, or move into a position for the separator•electrode-plate stacking work, in a direction orthogonal to the direction of the zigzag-folding of the separator, by the intermediary of a linear-drive mechanism. Further, it is set such that, at the time when either the zigzag-folding clamp 8 or the zigzag-folding clamp 9 is at the position for the stacking work, the other zigzag-folding clamp 9, or 8 is off the position for the stacking work. The electrode chucks 10, 20 are provided with notches 101, 102, and notches 201, 202, respectively, for use in accommodating the respective clamps, in order to prevent the electrode chucks 10, 20 from interfering with respective motions of these clamps as well as the electrode plate transfer heads (the positive plate transfer head 1, and the negative plate transfer head 2).

Guide rolls 7 in the final stage closest to the table, positioned above the table 5, are a pair of guide rolls adjacent to each other, and the separator 6 is guided to the upper surface of the table 5 through an interval between the pair of the guide rolls 7. The positive-plate transfer head 1 and the negative-plate transfer head 2 are set so as to alternately undergo a linearly reciprocating transfer in a horizontal direction at least on the table 5 by the intermediary of respective transfer mechanisms 43, 44 (refer to FIG. 2). Further, the direction of a horizontal and reciprocating transfer on the table 5, made by the positive-plate transfer head 1 and the negative-plate transfer head 2 is set to coincide with the folding-back direction of the zigzag-folding of the separator 6.

As shown in FIGS. 1(a) through 1(i), a force caused by the horizontal and reciprocating transfer that is alternately made by each of these transfer heads 1, 2 is imparted to the separator 6 guided onto the table 5, and the separator 6 is drawn onto the table 5, while being swung from side to side with the guide rolls 7 serving a fulcrum, whereupon winding-folding (the zigzag-folding) is executed on the table 5. Further, a motion for the zigzag-folding of the separator 6 and a motion for stacking of the positive-plate 3 and the negative-plate 4 are described later on in the present description.

As previously described, the positive-plate transfer head 1 and the negative-plate transfer head 2 are provided with the electrode-plate chucks 10, 20, for holding respective electrode-plates (the positive-plate 3 and the negative-plate 4). And these electrode-plate transfer heads 1, 2 each alternately make a linearly horizontal and reciprocating motion on the table 5 in the direction of the zigzag-folding of the separator 6 to thereby cause the separator 6 to undergo zigzag-folding by making use of the force caused by this motion, and the heads 1, 2 each are set to squarely oppose a separator zigzag-folding part on the table 5 upon reaching the respective forward-motion points on the table 5. The positive-plate transfer head 1 (the negative-plate transfer head 2) falls at a squarely-opposed position corresponding to the forward-motion point, as shown in FIGS. 1(c) and 1(f) whereupon the electrode-plate chuck 10 (20) is released, and the positive-plate 3 and the negative-plate 4 are alternately fed onto the separator 6 to be subjected to the zigzag-folding. For the respective electrode-plate chucks 10, 20 of the electrode-plate transfer heads 1, 2, adoption of various forms can be taken into consideration, and for example, a vacuum chuck making use of vacuum-contact can be applied as a preferable example. Further, the respective tips of the electrode-plate transfer heads 1, 2, in a transfer direction thereof, are provided with cylinder 11, and cylinder 12, for use in the zigzag-folding of the separator 6. These cylinders 11, and cylinders 12 are disposed so as to be in vertical pairs and the longitudinal directions thereof are in agreement with a widthwise direction of the separator 6.

Now, a motion for the zigzag-folding of the separator 6, and a motion for stacking of the electrode-plates 3, 4 are described in detail.

In the initial state of a stacking work, the positive-plate transfer head 1, and the negative-plate transfer head 2 are at respective standby positions set up beside the table 5, that is, directly above a positive-plate standby stage 40, and a negative-plate standby stage 41 as shown in FIG. 1(*a*).

The standby position of the positive-plate transfer head and the standby position of the negative-plate transfer head are disposed in such a way as to oppose each other in the direction of the zigzag-folding with the table 5 interposed therebetween, and the positive-plate standby stage 40, and the negative-plate standby stage 41, corresponding to the respective standby positions, are similarly disposed so as to oppose each other in respective fixed states.

At the time for the stacking work, the separator 6 is set to be drawn out onto the table 5. With this setting, an operator draws out the band-like separator 6 from above the table 5 upon the stacking work being started, as previously described. The separator 6 is drawn out until a part thereof is protruded from one end of the table 5, and the part of the separator 6, as drawn out, is held down on the upper surface of the table 5 by the zigzag-folding clamp 8 (FIG. 1(*a*)). The zigzag-folding clamp 8 is provided with a vertical-transfer mechanism, and at the time when the zigzag-folding clamp 8 is in a standby state, the zigzag-folding clamp 8 is at a position off the position for the separator•electrode-plate stacking work, so as to be at an upper position indicated by a dash and dotted lined shown in FIG. 1(*a*), whereas at the time when the zigzag-folding clamp 8 functions as the holding-down member, the zigzag-folding clamp 8 moves into the position for the separator•electrode-plate stacking work to be transferred in a downward direction as far as a position indicated by a solid line shown in FIG. 1(*a*).

Figure 2:
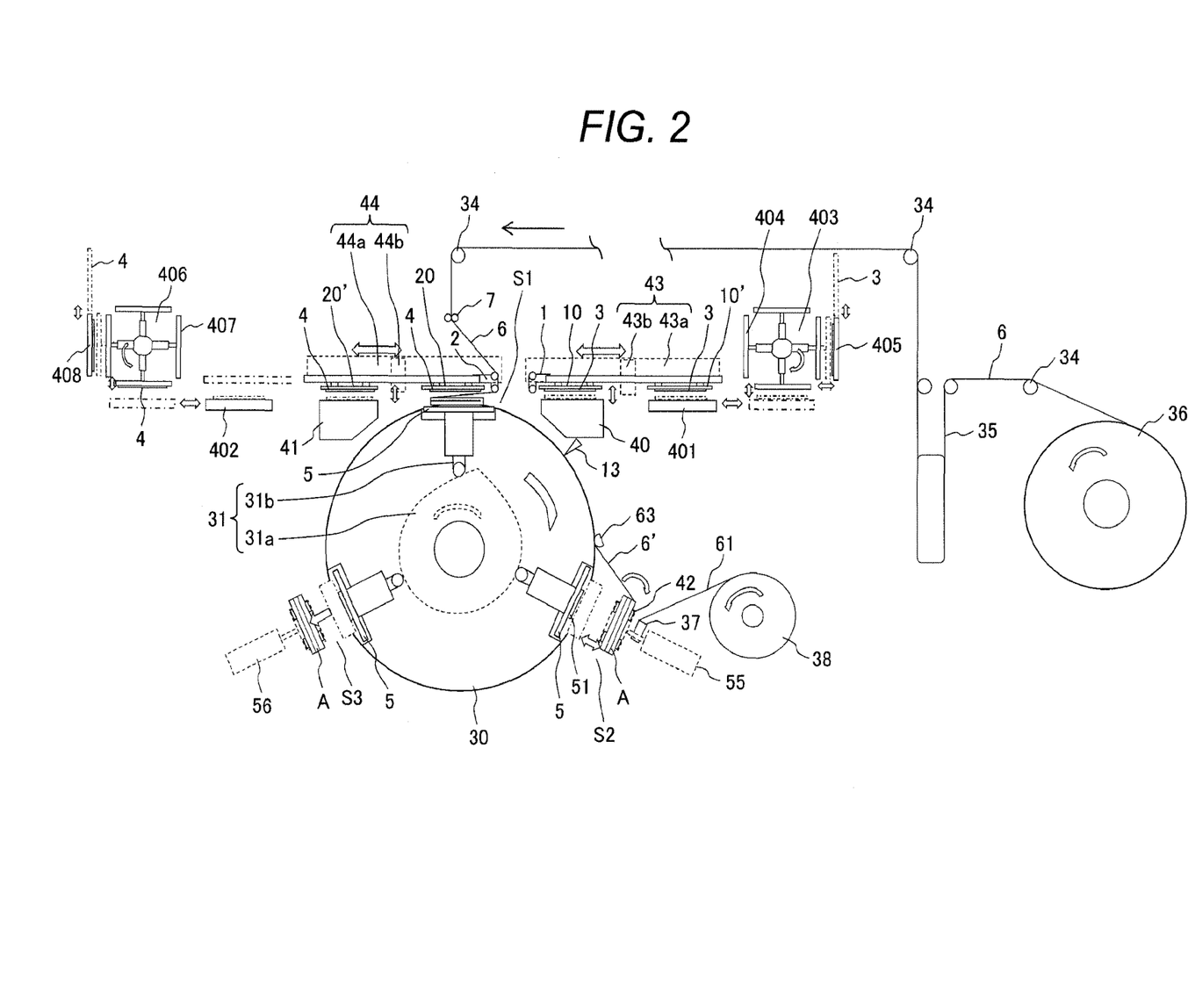
FIG. 2 is a schematic diagram of a stacked cell manufacturing apparatus according to one embodiment of the invention.

After the separator 6 is set in the initial position shown in FIG. 1(*a*), either of the electrode-plate transfer heads (in the present embodiment, the positive-plate transfer head 1) is first caused to make a forward-motion (an advance-motion) on the table 5 (FIG. 1(*b*)) by the intermediary of a horizontal uniaxial drive-mechanism 43*a* (refer to FIG. 2). An electrode-plate transfer-head drive-mechanism 43 (the horizontal uniaxial drive-mechanism 43*a*, and a vertical uniaxial drive-mechanism 43*b*) is described later on with reference to FIG. 2. More specifically, the positive-plate transfer head 1 makes a horizontal forward-motion (the advance-motion) along the direction of the zigzag-folding of the separator 6 on the table 5 by the intermediary of the horizontal uniaxial drive-mechanism 43*a*, as shown in FIG. 1(*b*). Due to a transfer of the positive-plate transfer head 1 (hereinafter abbreviated at times as "the head 1"), a part of the separator 6 is swung in one direction (in FIG. 1(*b*), from the right-hand side on the plane of the figure to the left-hand side), while being drawn onto the table 5 by the head 1. At the forward-motion point of the head 1, the zigzag-folding clamp 8 retracts, whereupon the head 1 falls by the agency of the vertical uniaxial drive-mechanism 43*b*. Due to a fall-motion of the head 1, a portion of the separator 6, drawn onto the table 5, is pressed to the table 5 by the intermediary of the positive-plate 3 positive-plate held by the electrode—plate chuck 10 (FIG. 1(*c*)). In this state, the vacuum-contact of the electrode-plate chuck 10 is released, and the positive-plate 3 held by the electrode-plate chuck 10 is disengaged from the electrode-plate chuck 10 to be thereby transferred to the upper surface of the zigzag-folding of the separator 6.

The electrode-plate chuck 10 is provided on the underside of the positive-plate transfer head 1 to be disposed at a front part of the head 1, in the forward-motion direction thereof, in the travelling direction of the head 1. Another electrode-plate chuck 10' is provided at a back part of the head 1. The electrode-plate chuck 10' transfers a positive-plate (for replenishment) 3 to serve as a stacking target to the positive-plate standby stage 40. More specifically, when the electrode-plate chuck 10' is at the position of a forward-motion point, as shown in FIGS. 1(*b*) and 1(*c*), the electrode-plate chuck 10' is positioned above the positive-plate standby stage 40, whereas when the head 1 is at a fall-position, as shown in FIG. 1(*c*), the next positive-plate 3 is released from holding by adsorption to thereby cause this positive-plate 3 to be disengaged from the electrode-plate chuck 10' to be transferred to the positive-plate standby stage 40. The positive-plate standby stage 40 is provided with a position-correcting mechanism for setting the position of the positive-plate 3 as transferred to a correct position. In this connection, a negative-plate standby stage 41 to be described later on, as well, is similarly provided with a position-correcting mechanism for a negative-plate 4. It is set such that the electrode-plate chuck 10' is positioned directly above a positive-plate replenishing-delivery stage 401 (refer to FIG. 2) when the head 1 is at a retreat-position (a backward-motion position), and the next positive-plate 3 is delivered to the positive-plate replenishing-delivery stage 401.

The table 5 undergoes a fall-motion by the intermediary of a table elevator-mechanism 31 (refer to FIG. 2) to an extent corresponding to the positive-plate 3 and the separator 6, as stacked. The table elevator-mechanism 31 is described in detail later on.

Subsequently, the head 1 makes arising-transfer, as shown in FIG. 1(*d*), in which state, the zigzag-folding clamp (the second zigzag-folding clamp) 9 moves into the position for the separator•electrode-plate stacking work according to the same motion as that of the zigzag-folding clamp 8. In this state, a part of the positive-plate 3 placed on the upper surface of the zigzag-folding of the separator 6 is held down on the upper surface of the table 5 by the zigzag-folding clamp 9. The zigzag-folding clamp 9 is provided with a vertical-transfer mechanism as well as a transfer mechanism for back-and-forth motion in a horizontal direction orthogonal to the direction of the zigzag-folding as is the case with the zigzag-folding clamp 8, and the zigzag-folding clamp 9 in a standby state is at a position off the position for the separator•electrode-plate stacking work, and at the time when the zigzag-folding clamp 9 functions as the holding-down member, the zigzag-folding clamp 9 moves into the position for the separator•electrode-plate stacking work to be transferred in a downward direction.

Thereafter, the positive-plate transfer head 1 makes a horizontal backward-motion (a retreat-motion) on the table 5, and in sync with this transfer, the negative-plate transfer head 2 (hereinafter abbreviated at times as "the head 2") makes a horizontal forward-motion (an advance-motion) on the table 5 by the intermediary of a horizontal uniaxial drive-mechanism 44*a* (refer to FIG. 2). Upon the horizontal forward-motion being made by the negative-plate transfer head 2, the zigzag-folding clamp 9 acts as a holding-down member, thereby holding down the positive-plate 3 on the upper surface of the zigzag-folding of the separator 6 at a position on a side of the valley-folding of the zigzag-folding of the separator 6. Due to this motion for holding down the separator made in collaboration with the horizontal forward-motion made by the negative-plate transfer head 2, a portion of the separator 6 is swung in one direction (in FIG. 1(*e*) from the left-hand side on the plane of the figure to the right-hand side), while being drawn onto the table 5 by the head 2.

At the forward-motion point of the head 2, the zigzag-folding clamp 9 retracts, whereupon the head 2 falls by the intermediary of a vertical uniaxial drive-mechanism 44*b* (refer to FIG. 2). Due to a fall-motion of the heat 2, a portion of the separator 6, drawn onto the table 5, is pressed to the positive-plate 3 through the negative-plate 4 held by the electrode-plate chuck 20 (FIG. 1(f)). In this state, the vacuum contact of the electrode-plate chuck 20 is released, and the negative-plate 4 held by the electrode-plate chuck 20 is disengaged from the electrode-plate chuck 20 to be transferred to the upper surface of the zigzag-folding of the separator 6. In sync with the fall-motion of the head 2, the head 1 as well undergoes a fall-motion to thereby hold the next positive-plate 3 on the positive-plate standby stage 40 through adsorption by the intermediary of the electrode-plate chuck 10.

The electrode-plate chuck 20 is provided on the underside of the negative-plate transfer head 2 to be disposed at a front part of the head 2, in the travelling direction of the head 2, in the direction of the forward-motion thereof. Another electrode-plate chuck 20' is provided at a back part of the head 2. The electrode-plate chuck 20' transfers a negative-plate (for replenishment) 4 to serve as a stacking target to the negative-plate standby stage 41. More specifically, when the electrode-plate chuck 20' is at a position of the forward-motion point, as shown in FIGS. 1(e), and 1(f), the electrode-plate chuck 20' is positioned above the negative-plate standby stage 41, whereas when the head 2 is at a fall position, as shown in FIG. 1(f), the next negative-plate 4 is released from holding by adsorption to thereby disengage this negative-plate 4 from the electrode-plate chuck 20' to be transferred to the negative-plate standby stage 41. It is set such that the electrode-plate chuck 20' is positioned directly above a negative-plate replenishing-delivery stage 402 (refer to FIG. 2) when the head 2 is at a retreat-position (a backward-motion position), and the next negative-plate 4 is delivered to the negative-plate replenishing-delivery stage 402.

The table 5 makes a fall-motion by the intermediary of the table elevator-mechanism 31 (refer to FIG. 2) to an extent corresponding to the negative-plate 4 and the separator 6, as stacked.

Subsequently, the head 2 makes a rising-motion, as shown in FIG. 1(g), in which state, the zigzag-folding clamp (the first zigzag-folding clamp) 8 moves into the position for the separator•electrode-plate stacking work according to the same motion as that of the zigzag-folding clamp 9. In this state, a portion of the negative-plate 4 placed on the upper surface of the zigzag-folding of the separator 6 is held down on the upper surface of the table 5 by the zigzag-folding clamp 8. At the time when the zigzag-folding clamp 8 functions as the holding-down member, the zigzag-folding clamp 8 moves into the position for the separator•electrode-plate stacking work to be transferred in a downward direction. In sync with the rising of the head 2, the head 1 as well rises while adsorbing the positive-plate 3, thereby being in the standby state.

Thereafter, the negative-plate transfer head 2 makes the horizontal backward-motion (the retreat-motion) on the table 5, as shown in FIG. 1(h), and in sync with this transfer, the positive-plate transfer head 1 makes the horizontal forward-motion (the advance-motion) on the table 5 by the intermediary of the horizontal uniaxial drive-mechanism 43a (refer to FIG. 2). At the time of the horizontal forward-motion made by the positive-plate transfer head 1, the zigzag-folding clamp 8 serves as a holding-down member for exclusive use by a negative-plate, thereby holding down the negative-plate 4 on the upper surface of the zigzag-folding of the separator 6 at a position on the side of the valley-folding of the zigzag-folding of the separator 6. Due to this motion for holding down the separator, made in collaboration with the horizontal forward-motion made by the positive-plate transfer head 1, a portion of the separator 6 is swung in one direction (from the right-hand side on the plane of the figure to the left-hand side, in FIG. 1(h)), while being drawn onto the table 5 by the head 1.

At this point in time, the negative-plate transfer head 2 returns above the negative-plate standby stage 41, as the standby position, due to the horizontal backward-motion thereof, thereby making a fall-motion to thereby hold the negative-plate 4 at the standby position by adsorption by the intermediary of the electrode-plate chuck 20. Henceforth, the motions described in FIGS. 1(b) through 1(h) are repeated, whereupon a stacked body A of the positive-plate/the separator/the negative-plate is being formed (refer to FIG. 1(i)).

Figure 1J:
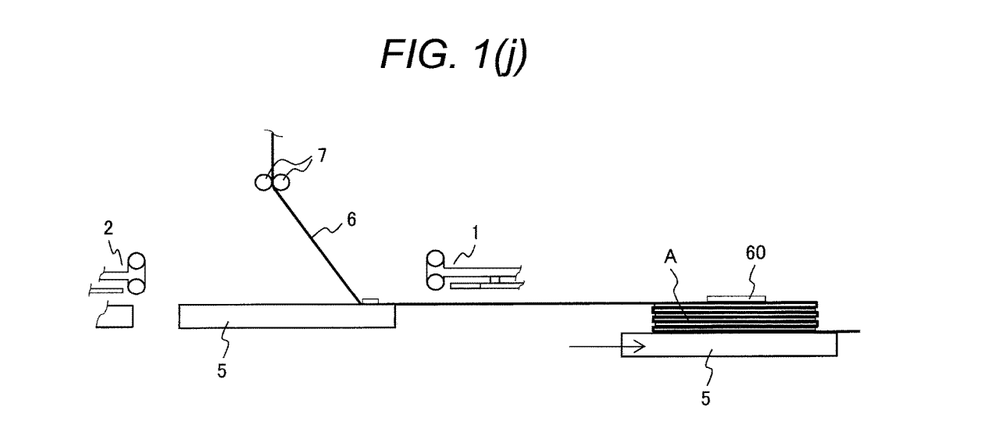
FIG. 1(j) is an illustration diagram showing a step of stacking the separator/the electrode-plates of the stacked cell manufacturing method according to the embodiment of the invention.

When a predetermined number of the electrode plates (the positive-plates, and the negative-plates) are stacked one after another by the intermediary of the zigzag folded separator, the head for executing the last zigzag-folding (in the present embodiment, the positive-plate transfer head 1) undergoes a horizontal transfer in the zigzag-folding direction without holding the positive-plate, as shown in FIG. 1(i), thereby forming a predetermined stacked body A of the positive-plate/the separator/the negative-plate. Upon the formation of the stacked body A, the table 5 undergoes a transfer at a position for the post-stacking step by the intermediary of a table-transfer mechanism (the horizontal axis rotator 30, shown in FIG. 2), as shown in FIG. 1(j). Further, another table 5 is set at a position for the stacking work of the positive-plate/the separator/the negative-plate (a stacking work station) by the intermediary of the table-transfer mechanism.

Figure 1K:
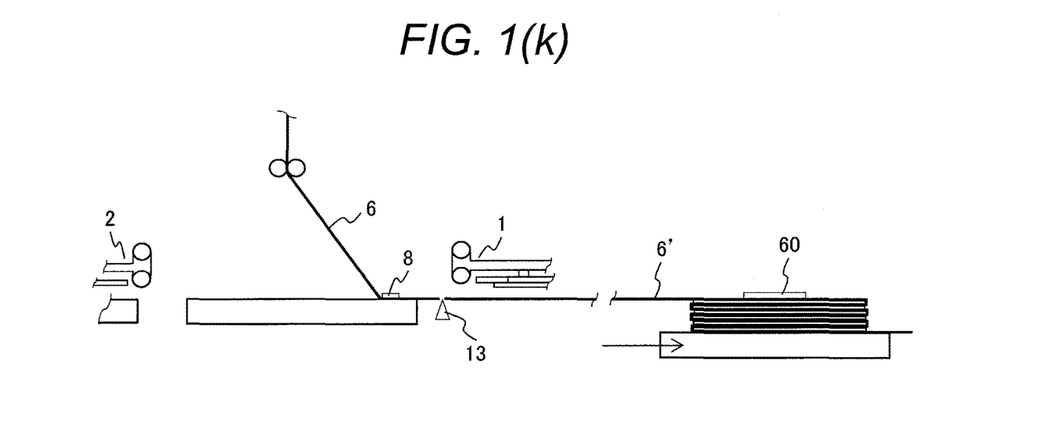
FIG. 1(k) is an illustration diagram showing a step of stacking the separator/the electrode-plates of the stacked cell manufacturing method according to the embodiment of the invention.
Figure 1L:
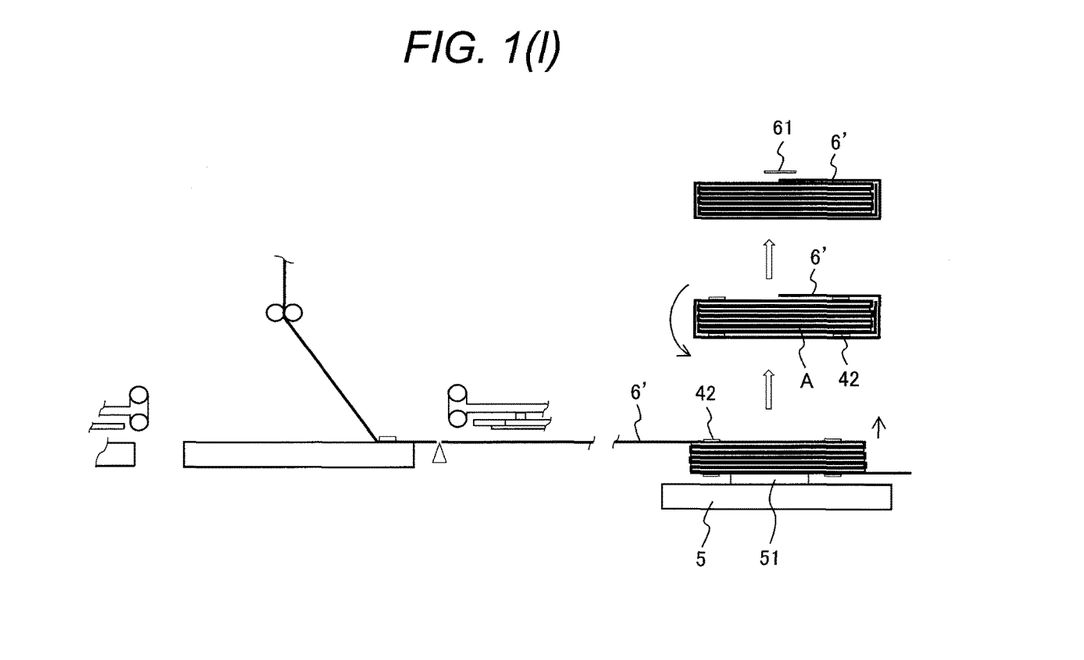
FIG. 1(l) is an illustration diagram showing a step of stacking the separator/the electrode-plates of the stacked cell manufacturing method according to the embodiment of the invention.

In a process whereby the table 5 after the stacking step is transferred up to a post-stacking work position, a tail 6' of the separator 6, trails behind the stacked body (a half-cell product) A, as shown in FIG. 1(k). Further, in a transfer process of the stacked body A, the stacked body A is supported by a transfer clamp 60. The separator tail 6' is cut at a position between a station for the post-stacking step and a station for the stacking-step by use of a cutter 13. The stacked body A having the separator tail 6' as cut off is slightly raised by the intermediary of a stacked-body lift-mechanism 51 provided on the table 5, as shown in FIG. 1(l), in which state, the stacked body A is grasped by the intermediary of a rotary-chuck mechanism 42 to be disengaged from the table 5, whereupon the stacked body A is rotated in a direction in which the separator tail 6' wraps around the outer circumference of the stacked body A by the intermediary of the rotary-chuck mechanism 42 rotating by use of a motor. As illustrated in FIG. 2, the separator tail 6' is held down by a holding member 63. The outer circumference of the stacked body A is wrapped around by the separator tail 6' due to this rotation, so that the periphery of the stacked body A is fully covered by a separator material. One end of the separator tail 6' is finally fastened to the stacked body A with the use of an adhesive tape 61 sent out from an adhesive-tape feeding mechanism. Another table 5 is present at the station for the stacking-step at the time of this post-stacking step, and the same stacking-step as described above is executed in parallel.

FIG. 2 shows one embodiment of an apparatus for use in execution of the stacked cell manufacturing method described in the foregoing. Respective constituent elements identical to, or in common with those, in each of FIGS. 1(a) through 1(l), are denoted by the same reference numerals as used in the respective figures.

In FIG. 2, a plurality of the tables 5 are prepared, and these tables 5 are disposed at equal intervals, spaced by a predetermined angle, along the periphery of the horizontal axis rotator 30 capable of intermittent rotation by the agency of a servomotor (not shown). With the present embodiment, three pieces of the tables 5 are disposed at equal intervals, spaced by every 120 degrees, however, an optional number of the pieces thereof may be disposed without limitation thereto. The horizontal axis rotator 30 is provided directly underneath a travelling path of the horizontal and reciprocating transfer made by the positive-plate transfer head 1 and the negative-plate transfer head 2 such that a tangent direction of an upper part of the outer circumference of the horizontal axis rotator 30 is in parallel with the direction of the horizontal and reciprocating transfer of the positive-plate transfer head 1 as well as the negative-plate transfer head 2.

The respective tables 5 to be disposed at the equal intervals are set so as to be sequentially transferred from a station S1 as a work position for the stacking step of manufacturing a cell (FIG. 1(a) through 1(i)) to stations S2, S3, as respective work positions for the post-stacking step to be executed after the stacking step every time the horizontal axis rotator 30 undergoes intermittent rotation by the predetermined angle (in the present embodiment, 120 degrees) and returning to the station S1 for the stacking step again upon one-shot rotation of the horizontal axis rotator 30.

The cutter 13 is disposed between the station S2 for the post-stacking step and station S1 for the stacking step. The separator tail 6' trailing behind the stacked body A after the stacking step is cut by the cutter 13 between the station S2 and the station S1, as shown in FIG. 1(k).

A rotary-chuck 42 is provided in the station S2. The table 5 is configured in such a way as to raise the stacked body A at the position of the station S2 up to a position as appropriate by use of the lift-mechanism 51. The rotary-chuck 42 is provided with an actuator 55 having a mechanism for rotating the rotary-chuck itself by use of a motor, and a mechanism capable of causing the rotary-chuck to approach, or move away from the table 5 present in the station S2. Since the stacked body A is raised by the table 5, the rotary-chuck 42 can grasp the stacked body A with ease. The rotary-chuck 42 having grasped the stacked body A is disengaged from the table 5 by the agency of the actuator 55 to be rotated before being returned to the table 5 again.

The stacked body A having the separator tail 6' as cut off is disengaged from the table 5, and is subsequently rotated by the intermediary of the rotary-chuck 42, whereupon the separator tail 6' is wrapped around the outer circumference of the stacked body A due to this rotation. A tape-sticking unit 37 is disposed in the station S2. The tape-sticking unit 37 cuts an adhesive tape 61 fed from an adhesive-tape feeder (for example, adhesive-tape feed-reel) 38 into a strip-like shape, and this adhesive tape 61 as cut off in the strip-like shape is imparted to a position at one end of the separator tail 6', whereupon the separator tail 6' after completion of wrapping-around is fastened to the stacked body A.

The stacked body A after completion of the post-stacking step in the station S2 is returned to the table 5 by the intermediary of the actuator 55, and the rotary-chuck 42 to be subsequently sent out to the station S3 due to the intermittent rotation of the horizontal axis rotator 30. An actuator 56 provided with the same chuck mechanism as with the case of the station S2 is disposed in the station S3 as well, and at this position, the stacked body A is taken out.

At the horizontal axis rotator 30, the predetermined steps in the respective stations S1, S2, and S3 are executed in parallel with each other.

Herein, the positive-plate transfer head 1 and the negative-plate transfer head 2 are disposed in the horizontal direction coinciding with the folding-back direction of the zigzag-folding of the separator 6 in such a way as to oppose each other with the table 5 in the station S1, interposed therebetween.

The positive-plate transfer head 1 has the above-mentioned electrode-plate chuck 10, and the electrode-plate chuck 10', provided at the respective ends of the head 1, in the horizontal transfer direction thereof. Similarly, the negative-plate transfer head 2 has the electrode-plate chuck 20, and the electrode-plate chuck 20', provided at the respective ends of the head 2, in the horizontal transfer direction thereof. It is set such that, in the case where the positive-plate transfer head 1 is at the retreat-position indicated by a solid line shown in FIG. 2, the electrode-plate chuck 10 is positioned directly above the positive-plate standby stage 40, and the electrode-plate chuck 10' is positioned directly above the positive-plate replenishing-delivery stage 401. Similarly, it is set such that, in the case where the negative-plate transfer head 2 is at the retreat-position indicated by a dash and dotted line shown in FIG. 2, the electrode-plate chuck 20 is positioned directly above the negative-plate standby stage 41, and the electrode-plate chuck 20' is positioned directly above the negative-plate replenishing-delivery stage 402. Further, it is set such that, in the case where the positive-plate transfer head 1 is at a position of the advance-motion, the positive-plate chuck 10 is positioned directly above the table 5 in the station S1, and the positive-plate chuck 10' is positioned directly above the positive-plate standby stage 40. Similarly, it is set such that, in the case where the negative-plate transfer head 2 is at the position of the advance-motion, indicated by the solid line shown in FIG. 2, the electrode-plate chuck 20 is positioned directly above the table 5 in the station S1, and the electrode-plate chuck 20' is positioned directly above the negative-plate standby stage 41.

A positive-plate feeder 403 is provided with positive-plate rolls (not shown) of a coiled band-like positive-plate sheet, a cutting machine (not shown) for cutting the positive-plate sheet fed from the positive-plate rolls, a drawing machine 405 for drawing out positive-plates 3 sequentially cut into a size of the negative-plate by the cutting machine, and a vacuum contact unit 404 having a rotary mechanism for receiving the positive-plates 3 from the drawing machine 405 so as to be delivered to the positive-plate replenishing-delivery stage 401. The vacuum contact unit 404 is provided with a plurality of adsorbers, and these adsorbers are each intermittently rotated by a predetermined angle (for example, every 90 degrees) to thereby release the positive-plates 3 from the vacuum-contact before delivery to the positive-plate replenishing-delivery stage 401.

The positive-plate replenishing-delivery stage 401 is set to undergo a reciprocating transfer between a position directly underneath the electrode-plate chuck 10' when the positive-plate transfer head 1 is at the retreat-position and the vacuum contact unit 404, by the intermediary of the transfer mechanism, and when the positive-plate transfer head 1 is at the retreat-position, the positive-plate replenishing-delivery stage 401 is positioned directly underneath the electrode-plate chuck 10' to thereby deliver the positive-plate 3 to the electrode-plate chuck 10'. This delivery is implemented by the vertical motion of the head 1, and a vacuum-contact motion.

A negative-plate feeder 406 as well is made up in the same way as the positive-plate feeder 403. More specifically, the negative-plate feeder 406 is provided with a negative-plate roll (not shown) of a band-like negative-plate sheet, a cutting machine (not shown) for cutting a negative-plate sheet fed from the negative-plate roll, a drawing machine 408 for drawing out negative-plates 4 as sequentially cut into a size of the negative-plate by the cutting machine, and a vacuum contact unit 407 having a rotary mechanism for receiving the negative-plates 4 from the drawing machine 408 so as to be delivered to the negative-plate replenishing-delivery stage 402.

It is set such that the negative-plate replenishing-delivery stage 402 undergoes a reciprocating transfer between a position directly underneath the electrode-plate chuck 20' when the negative-plate transfer head 2 is at the retreat-position and a vacuum contact unit 407 by the intermediary of the transfer mechanism, and the negative-plate replenishing-delivery stage 402 is positioned directly underneath the electrode-plate chuck 20' when the negative-plate transfer head 2 is at the retreat-position to thereby deliver the negative-plate 4 to the electrode-plate chuck 20'. This delivery is executed by the vertical motion of the head 2, and the vacuum-contact motion.

Respective motions for the zigzag-folding of the separator, and the stacking of the separator•electrode-plates, executed in the station S1, have already been described in detail with reference to FIGS. 1(*a*) through 1(*l*), omitting therefore description thereof.

The respective drive mechanisms of the electrode-plate transfer heads 1, 2 are made up of a combination of a uniaxial and horizontal rectilinear actuator, and a uniaxial and vertical rectilinear actuator, including one making use of, for example, a ball screw rod, a hydraulic cylinder, and so forth.

The table elevator-mechanism 31 is made up of a rotary cam plate 31*a* rotatable independently from the horizontal axis rotator 30, and a rod 31*b* for converting the rotation of the cam plate 31*a* into rectilinear motion, and so forth. In addition, use may be made of the ball screw rod, the hydraulic cylinder, and so forth.

The respective motions of the electrode-plate transfer heads 1, 2, the rotational motion of the horizontal axis rotator 30, the respective motions of the electrode-plate feeders 403, 406, the respective motions of the vacuum contact units 404, 407, and the motion of the table elevator-mechanism 31 are implemented by use of a control unit in accordance with a predetermined sequence.

The present embodiment has advantages as described in the following items, in addition to advantageous effects described above:

(i) since the separator is processed on a continuous basis, the number of times that the separator is cut can be reduced to one per one stacking, so that the risk of foreign-matter interfusion can be minimized;
(ii) since the stacking is executed with the electrode plates in a stacking part, always in a state as held-down by the clamp function of the apparatus, the separator, and the electrode plate are insusceptible to deviation in position;
(iii) electrode-plate clamp (the holding-down member) becomes a guide for the valley-folding at the time of folding the separator, so that correct folding-back of the separator can be effected;
(iv) stacking is enabled without constraints due to the quality as well as the characteristics (heat-resistant type) of the separator;
(v) since the transfer direction of the separator is identical to that of the electrode-plate, waste in time for the transfer motion is minimized, so that operating time of transference can be minimized, and speed and acceleration can be held back, thereby eliminating damage to the separator; and
(vi) If use is made of the effect of causing no damage due to the effect of the item (v) as above, this will enable the stacking at a higher speed to thereby contribute to enhancement in productivity.

What is claimed is:

1. A stacked cell manufacturing method comprising the steps of:
   executing zigzag-folding of a band-like separator on a table by a zigzag-folding mechanism;
   alternately feeding a positive-plate and a negative-plate onto the separator as folded back by a positive-plate feeding-mechanism, and a negative-plate feeding-mechanism every time the separator is folded back by the zigzag-folding; and
   alternately stacking the positive-plate and the negative-plate on the table with the separator interposed therebetween,
   wherein a positive-plate transfer head as a part of the positive-plate feeding-mechanism, and a negative-plate transfer head as a part of the negative-plate feeding-mechanism are set so as to alternately undergo a linearly reciprocating transfer between a position for an electrode-plate stacking work and standby positions of the positive-plate transfer head and the negative-plate transfer head feeding an electrode-plate in a horizontal direction at least on the table by respective transfer mechanisms in the step of stacking,
   a direction of a horizontal and reciprocating transfer between the position for the electrode-plate stacking work and the standby positions of the positive-plate transfer head and the negative-plate transfer head feeding the electrode-plate on the table made by the positive-plate transfer head and the negative-plate transfer head is set to coincide with a folding-back direction of the zigzag-folding of the separator, and
   a force caused by the horizontal and reciprocating transfer between the position for the electrode-plate stacking work and the standby positions of the positive-plate transfer head and the negative-plate transfer head feeding the electrode-plate alternately made by each of these transfer heads is imparted to the separator guided onto the table by the positive-plate transfer head and the negative-plate transfer head, respectively, thereby executing the zigzag-folding while the separator is drawn onto the table, set to hold down to the table by a zigzag-folding clamp and securing a valley-folding of the zigzag-folding of the separator, and
   the positive-plate transfer head and the negative-plate transfer head alternately feed the positive-plate and the negative-plate, respectively, onto the table, while executing the zigzag-folding of the separator.

2. The stacked cell manufacturing method according to claim 1,
   wherein if the electrode-plate overlaid on the separator subjected to the zigzag-folding is the positive-plate in the stacking step, the positive-plate is held down by the zigzag-folding clamp, at a position of the valley-folding the zigzag-folding of the separator, and
   if the electrode-plate is the negative-plate, the negative-plate is held down by the zigzag-folding clamp, at the position of the valley-folding of the zigzag-folding of the separator, the zigzag-folding clamp serves as a guide for the inside of the valley-folding at the time of the zigzag-folding of the separator, and the zigzag-folding clamp is moved from, or into respective stacking positions of the positive-plate and the negative-plate.

3. The stacked cell manufacturing method according to claim 1, wherein a plurality of tables, including the table, are provided to be disposed at equal intervals, spaced by an angle, along a peripheral direction of a horizontal axis rotator capable of rotation, the horizontal axis rotator is provided directly underneath a travelling path of the horizontal and reciprocating transfer between the position for the electrode-plate stacking work and the standby positions of the positive-plate transfer head and the negative-plate transfer head feeding the electrode-plate made by the positive-plate transfer head and the negative-plate transfer head such that a tangent direction of an upper part of a periphery of the horizontal axis rotator is in parallel with the direction of the horizontal and reciprocating transfer between the position for the electrode-plate stacking work and the standby positions of the positive-plate transfer head and the negative-plate transfer head feeding the electrode-plate made by the positive-plate transfer head and the negative-plate transfer head, the plurality of the tables disposed at the equal intervals are set to be sequentially transferred through rotation of the horizontal axis rotator by the angle to a station at a position for the step of the stacking in cell-manufacturing to be subsequently transferred to a station at a position for a post-stacking step taken after the step of the stacking, the plurality of the tables being set to return to the station for the step of the stacking upon one-shot rotation of the horizontal axis rotator, and the step of the stacking, and the post-stacking step are taken in parallel with each other during an interval between the rotations of the horizontal axis rotator, when the rotation thereof is suspended.

4. The stacked cell manufacturing method according to claim 3, wherein the table is transferred to the station at the position for the subsequent post-stacking step through the rotation of the horizontal axis rotator by the angle after the step of the stacking is taken, a stacked body, together with a tail of the separator, trailing behind the stacked body, is caused to undergo vacuum-contact on the periphery of the horizontal axis rotator, while a stacked body of the electrode-plates and the separator, formed in the step of the stacking, is being held on the table by a clamp-mechanism at the time the table is transferred, the tail of the separator, present on the periphery of the horizontal axis rotator, is cut off by a cutter at a position between the station for the post-stacking step and the station for the stacking step, the stacked body is disengaged from the table in the station for the post-stacking step by a rotary-chuck mechanism to be rotated, the tail of the separator, remaining on a side of the stacked body as a result of the cutting of the separator, is wrapped around an outer periphery of the stacked body by the rotation of the horizontal axis rotator, and another table of the plurality of tables is present in the station for the stacking-step at the time of the post-stacking step, thereby enabling a new stacking step to be concurrently taken.

5. A stacked cell manufacturing apparatus having a zigzag-folding mechanism for executing zigzag-folding of a band-like separator on a table, and a positive-plate feeding-mechanism and a negative-plate feeding-mechanism, for alternately feeding a positive-plate and a negative-plate, onto the separator as folded back, every time the separator is folded back through the zigzag-folding, the positive-plate and the negative-plate being alternately stacked on the table with the separator subjected to the zigzag-folding, interposed therebetween, the stacked cell manufacturing apparatus comprising:

a positive-plate transfer head serving as a part of the positive-plate feeding-mechanism, for transferring the positive-plate prepared at a positive-plate feeder to a position for the zigzag-folding of the separator to be fed onto the separator as folded back;

a negative-plate transfer head serving as a part of the negative-plate feeding-mechanism, for transferring the negative-plate prepared at a negative-plate feeder to a position for the zigzag-folding of the separator to be fed onto the separator as folded back;

a transfer mechanism for the positive-plate transfer head to cause the positive-plate transfer head to make a horizontal reciprocating transfer between a position for an electrode-plate stacking work and a standby position of the positive-plate transfer head feeding the positive-plate at least on the table in a folding-back direction of the zigzag-folding of the separator; and a transfer mechanism for the negative-plate transfer head to cause the negative-plate transfer head to make a horizontal reciprocating transfer between the position for the electrode-plate stacking work and a standby position of the negative-plate transfer head feeding the negative-plate at least on the table in the folding-back direction of the zigzag-folding of the separator, wherein the positive-plate transfer head and the negative-plate transfer head are disposed so as to oppose each in a horizontal direction parallel to the table with the table interposed therebetween, in such a way as to coincide with the folding-back direction of the zigzag-folding of the separator, the positive-plate transfer head and the negative-plate transfer head being set to enable the horizontal reciprocating transfer between the position for the electrode-plate stacking work and the standby position of the positive-plate transfer head and the standby position of the negative-plate transfer head feeding the positive-plate and the negative-plate to be alternately made by controlling the respective transfer mechanisms, a force cause by the horizontal and reciprocating transfer between the position for the electrode-plate stacking work and the standby position of the positive-plate transfer head and the standby position of the negative-plate transfer head feeding the positive-plate and the negative-plate alternately made by each of these transfer heads is imparted to the separator guided onto the table by the positive-plate transfer head and the negative-plate transfer head thereby making up the zigzag-folding mechanism for executing the zigzag-folding of the separator, while drawing the separator onto the table, and the positive-plate transfer head and the negative-plate transfer head being set to alternately feed the positive-plate and the negative-plate onto the table, while executing the zigzag-folding of the separator.

6. The stacked cell manufacturing apparatus according to claim 5, further comprising a holding-down member motion-mechanism, wherein if an electrode-plate overlaid on the separator subjected to the zigzag-folding is the positive-plate, the positive-plate is held down by a holding-down member for exclusive use by the positive-plate, at a position inside of a valley-folding of the zigzag-folding of the separator, if the electrode-plate is the negative-plate, the negative-plate is held down by a holding-down member for exclusive use by a negative-plate, at a position inside of the valley-folding of the zigzag-folding of the separator, these holding-down members each serve as a guide for the inside of the valley-folding at the time of the zigzag-folding of the separator, and the holding-down member for exclusive use by the positive-plate, and the holding-down member for exclusive use by the negative-plate are alternately moved out from, or into respective stacking positions of the positive-plate and the negative-plate.

7. The stacked cell manufacturing apparatus according to claim 5, wherein a plurality of tables, including the table, are provided to be disposed at equal intervals, spaced by an angle, along a peripheral direction of a horizontal axis rotator capable of intermittent rotation, the horizontal axis rotator is provided directly underneath a travelling path of the horizontal and reciprocating transfer between the position for the electrode-plate stacking work and the standby position of the positive-plate transfer head and the standby position of the negative-plate transfer head feeding the electrode-plate made by the positive-plate transfer head and the negative-plate transfer head such that a tangent direction of an upper part of a periphery thereof is in parallel with a direction of the horizontal and reciprocating transfer between the position for the electrode-plate stacking work and the standby position of the positive-plate transfer head and the standby position of the negative-plate transfer head feeding the electrode-plate made by the positive-plate transfer head and the negative-plate transfer head, the plurality of the tables disposed at the equal intervals are set to sequentially reach a position directly underneath the travelling path of the horizontal and reciprocating transfer between the position for the electrode-plate stacking work and the standby position of the positive-plate transfer head and the standby position of the negative-plate transfer head feeding the electrode-plate made by the positive-plate transfer head and the negative-plate transfer head through the rotation of the horizontal axis rotator by the angle, and after the stacking of the separator, the positive-plate, and the negative-plate is executed at the position, the table is transferred to a position for a post-stacking work to be subsequently executed, the table being set to return again to a position where the stacking is executed upon one-shot rotation of the horizontal axis rotator.

8. The stacked cell manufacturing apparatus according to claim 7, further comprising:

a clamp-mechanism for holding a stacked body of the separator, the positive-plate, and the negative-plate at the time of transferring the table from the position for the electrode-plate stacking work to the position for the post-stacking work by the intermittent rotation of the horizontal axis rotator;

a vacuum-contact mechanism for causing the stacked body, together with a tail of the separator, trailing behind the stacked body, to undergo vacuum-contact on the periphery of the horizontal axis rotator, a cutter for cutting the tail of the separator, present on the periphery of the horizontal axis rotator, at a position between the position for the post-stacking work and the position for the electrode-plate stacking work; and a rotary-chuck mechanism for disengaging the stacked body from the table at the position for the post-stacking work so as to be rotated, and causing the tail of the separator, remaining on the side of the stacked body, as a result of the cutting of the separator, to wrap around the outer periphery of the stacked body, wherein another table of the plurality of tables is prepared at the position for the electrode-plate stacking work so as to be ready for a new stacking work at the time when the post-stacking work is executed.

* * * * *